(12) United States Patent
Post

(10) Patent No.: US 6,523,213 B1
(45) Date of Patent: *Feb. 25, 2003

(54) VEHICLE WINDOW CLEANING APPARATUS AND SYSTEM

(75) Inventor: Kenneth P. Post, Lincoln Park, MI (US)

(73) Assignee: K & R Industries, Inc., Lincoln Park, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,529

(22) Filed: Feb. 14, 2000

Related U.S. Application Data

(63) Continuation-in-part of application No. 09/104,957, filed on Jun. 25, 1998, now Pat. No. 6,178,584.

(51) Int. Cl.7 .................................................. A47L 1/06
(52) U.S. Cl. .................. 15/220.1; 15/104.94; 15/144.1; 15/145; 15/209.1; 15/232; 15/244.2; 403/316
(58) Field of Search ............................ 15/144.1, 144.2, 15/172, 220.1, 228, 231, 232, 244.2, 145, 209.1, 104.94; 403/315, 316, 329

(56) References Cited

U.S. PATENT DOCUMENTS

| | | | | |
|---|---|---|---|---|
| 296,235 A | * | 4/1884 | Sill ........................... | 15/231 X |
| 672,584 A | * | 4/1901 | Anderson ..................... | 15/232 |
| 1,084,184 A | | 1/1914 | Wenieke ..................... | 15/220.1 |
| 1,989,921 A | | 2/1935 | Goddard ..................... | 15/231 X |
| 1,993,571 A | * | 3/1935 | Soderberg ..................... | 15/231 |
| 2,127,886 A | * | 8/1938 | Plon ............................. | 15/231 |
| 2,192,910 A | * | 3/1940 | Hollenbeck ................... | 15/231 |
| 2,291,435 A | | 7/1942 | Anderson et al. ........... | 15/220.1 |
| 2,301,586 A | | 11/1942 | Rubin ......................... | 15/231 X |
| 2,304,127 A | | 12/1942 | Stetson ........................ | 15/231 |
| 2,315,325 A | * | 3/1943 | Gavurin ....................... | 15/145 X |
| 2,560,008 A | * | 7/1951 | Steward ........................ | 15/231 |
| 2,694,212 A | | 11/1954 | McGraw ..................... | 15/244.1 |
| 3,362,037 A | | 1/1968 | Griffin ..................... | 15/144.1 X |
| 3,761,991 A | | 10/1973 | Moss ......................... | 15/228 X |
| 4,503,579 A | | 3/1985 | Nicely ........................ | 15/244.2 |
| 4,926,522 A | | 5/1990 | Wang ........................... | 16/427 |
| 5,003,659 A | | 4/1991 | Paepke ..................... | 15/229.13 |
| 5,012,544 A | | 5/1991 | Verry ........................ | 15/209.1 |
| 5,095,574 A | | 3/1992 | Khanzadian ................. | 15/118 |
| 5,333,347 A | | 8/1994 | Stranders ................... | 15/220.1 |
| 5,596,787 A | | 1/1997 | Steven et al. .............. | 15/220.1 |
| 5,603,138 A | | 2/1997 | Bonis ........................ | 15/220.1 |
| 5,657,507 A | | 8/1997 | Wasak ....................... | 15/220.1 |

FOREIGN PATENT DOCUMENTS

| | | | | |
|---|---|---|---|---|
| FR | 1056318 | 10/1953 | ................... | 15/228 |
| GB | 406211 | 2/1934 | ................... | 15/232 |

* cited by examiner

*Primary Examiner*—Mark Spisich
(74) *Attorney, Agent, or Firm*—Young & Basile, PC

(57) ABSTRACT

A window cleaning apparatus includes a handle, a paddle and a cleaning element. The paddle is removably attachable to the handle. The cleaning element is one of a plurality of interchangeable bodies, each having one major surface engagable with one major surface of a paddle and side edges having elastic mounted thereon to draw the ends of the side edges of the body inward to form an opening smaller than the outer diameter of the paddle to releasably attach the cleaning element about the paddle. A first pair of receivers are mounted on each paddle and pivotally receive one end of the handle. A second pair of receivers, mounted in conjunction with the first pair of receivers on a paddle or as a separate element on a paddle, receive a second handle. In one aspect, the cleaning apparatus forms a cleaning system including a plurality of handles, a plurality of paddles and a plurality of cleaning elements releasably interconnectable into a cleaning apparatus formed of one handle, one cleaning element and one paddle.

22 Claims, 6 Drawing Sheets

VEHICLE WINDOW CLEANING APPARATUS AND SYSTEM

CROSS REFERENCE TO CO-PENDING APPLICATIONS

This application is a continuation-in-part of co-pending application Ser. No. 09/104,957, filed on Jun. 25, 1998, U.S. Pat. No. 6,178,584, the entire contents of which are incorporated herein by reference.

BACKGROUND OF THE INVENTION

1. Field of the Invention

The present invention relates, in general, to cleaning apparatus and more specifically, to apparatus for cleaning vehicle windows.

2. Description of the Art

Various tools are available to clean the exterior surface of vehicle windows. Such tools typically include a handle and a perpendicularly oriented cleaning element, such as a wiper blade, sponge rubber pad and combinations thereof Water or ammonia based cleaning fluid is applied to the exterior surface of the vehicle window and scraped off by the tools to remove debris. Such tools are easy to use on the exterior surface of vehicle windows since the exterior surface of the vehicle windows is easily accessible both to apply cleaning fluid to the windows and to remove the fluid and debris from the windows.

However, such tools are ineffective in cleaning the inner surface of vehicle windows. The extreme angles of the vehicle windshield and backlight with respect to the dashboard and rear seat shelf in conjunction with adjacent vehicle components, such as the rear view mirror, steering wheel and rear, center brake light housing make it difficult to get the edges of a cleaning tool close to the extreme lower edges of the windshield and backlight. In addition, applying fluid, which is typically in the form of a spray, to the inner surfaces of the windshield and backlight results in a significant amount of the spray being deposited on the underlying horizontal surfaces adjacent to the windows, such as the vehicle dashboard and the rear shelf.

Thus, the most common implements used to clean the inner surfaces of vehicle windows are sponges, rags and paper towels. Manual force is exerted through the user's hands to manually apply cleaning fluid and/or spray to the inner surface of the windows and then to manipulate the cleaning element in a back and forth or circular motion across the surface of the windows. While a user may be able with a considerable amount of effort to clean most of the inner surface of the vehicle window, it is still difficult to completely clean the edges of the window and, more importantly, the lower edges of a vehicle windshield and backlight.

A variety of tools have been devised specifically to clean the inner surfaces of vehicle windows. Such tools are typically formed of a pad which is connected to an elongated handle. A cleaning element is attached to one side of the pad by various means including clips, straps, or hook and pile fasteners. However, each of these tools is specifically devised for a single type of cleaning operation, such as scrubbing or drying, but not both.

While such tools improve the reach of the user and enable the user to clean the lower edges of vehicle windows, and in particular, the windshield and backlight, it is believed that further improvements can be made to such vehicle window cleaning apparatus to make the cleaning apparatus easier to use, to provide easily detachable and interchangeable mounting of different shaped pads or plates to the handle, as well as providing easy replacement of wet, soiled cleaning elements.

SUMMARY OF THE INVENTION

The present invention is a cleaning apparatus particularly suited for cleaning and drying the interior surfaces of vehicle windows.

In one aspect, the cleaning apparatus includes a substantially rigid paddle having first and second opposed surfaces. A handle is pivotally connected on one end to the first surface of the paddle. A cleaning element is removably affixed to the paddle. The cleaning element includes a first surface mountable in registry with the second surface of the paddle and side edges disposed over a peripheral portion of the paddle. Elastic means are provided on the side edges of the cleaning element for elastically securing the cleaning element about the paddle.

Preferably, the cleaning element forms part of a cleaning system which includes at least two distinct cleaning elements, one a scrubbing element including a fluid saturable inner layer and, another, a drying body formed of an absorbent material. The ends of the side edges of the cleaning element are drawn inward by the elastic means to form an opening normally smaller than the periphery of the paddle.

Hinge means are cooperatively formed on the first surface of the paddle and the one end of the handle for pivotally connecting the paddle to the handle. Means are formed on the hinge means for biasing a pivot pin into a hinge receiver to detachably connect the paddle to the handle.

Preferably, the hinge means includes first and second pivot pins extending coaxially outward from opposed sides of the one end of the handle. First and second receivers are mounted on the paddle for receiving the first and second pivot pins, respectively. A spring biased means is carried on the handle for retractably biasing one of the first and second pivot pins outward from the handle.

An aperture is formed in the end of the handle opening to an interior chamber in the end of the handle. A slider carries one of the first and second pivot pins and is movably disposed within the interior chamber. A spring is engagable with the slider for normally biasing the slider to a position in which the one of the first and second pivot pins extends outward through the aperture in the end of the handle for releasable engagement in one of the first and second receivers. A projection extends from the slider through another opening in the handle to facilitate manual movement of the slider.

In another aspect of the present invention, the above-described cleaning apparatus forms part of a cleaning system which includes a first handle, a plurality of cleaning elements of the same or different shape, and a plurality of paddles, at least some of which have a different peripheral shape. The cleaning elements are easily mountable onto any of the paddles to enable a clean and dry cleaning element to be used when needed. In addition, each of the paddles is quickly and easily attachable and detachable from the handle for ease in using the cleaning system of the present invention.

In another aspect, the cleaning apparatus and cleaning system of the present invention includes a second handle having a generally inverted U-shape with opposed lower ends extending oppositely outward from each other. The handle ends are releasably mountable in a second pair of receivers formed on each paddle. The paddles receive cleaning elements as in the above-described aspects of the invention.

Generally, the second handle is of one-piece construction with lower S-shaped side legs extending between an upper hand engagement portion and the ends. The S-shape side legs are is configured to absorb forces exerted by the user on the handle during movement of the paddle. The second set receivers may also be formed on the same paddles in the first aspect of the invention. This enables either the first or second handles to be employed with any paddle thereby further enhancing the interchangeability of the various components of the cleaning system of the present invention.

The cleaning apparatus of the present invention affords numerous advantages over prior cleaning apparatus devised for cleaning the interior surfaces of vehicle windows. The present cleaning apparatus enables a plurality of different shaped paddles and attached scrubbing and drying elements to be detachably mounted on one handle for use in practically any vehicle window cleaning application. The cleaning apparatus lends itself to use as part of a cleaning system formed of one or more handles, a plurality of different shaped paddles, and releasably attachable cleaning elements. The cleaning elements are easily mountable and removable from the paddles and the paddles are easily attachable and detachable to either handle. The present cleaning apparatus enables a user, for example, to easily reach the lower edges of the interior surface of vehicle windows adjacent to the vehicle dash board or rear backlight despite the extreme angles of such windows with respect to interior vehicle surfaces and the adjacent rear view mirror, steering wheel or rear center brake light assembly housing.

The present cleaning apparatus is also usable without a handle. In such an application, the user need only grab the two enlarged receivers on the paddles for the first handle to manipulate the paddle and attached cleaning element over a surface. The different cleaning elements are easily attachable and removable from the paddle thereby minimizing the total time required for each cleaning operation as a scrubbing element and one or more drying elements can be quickly and easily mounted on a paddle.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
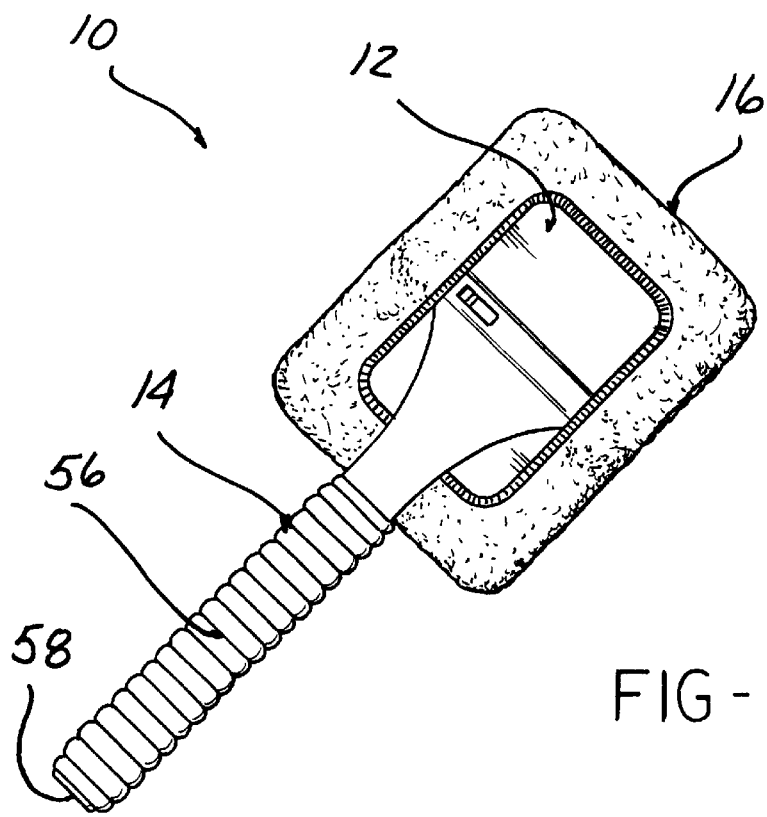
FIG. 1 is an assembled, perspective view of a first embodiment of a cleaning apparatus according to the present invention with a drying element mounted thereon.

Referring now to the drawing, and to FIGS. 1–5 in particular, there is depicted a first embodiment of a cleaning apparatus 10 constructed in accordance with the teachings of the present invention. It will be understood that although the following description of the use of the cleaning apparatus 10 in cleaning and drying the interior surfaces of vehicle windows, the cleaning apparatus 10 may also be applied in a variety of other cleaning applications, such as to clean and dry the exterior surface of the vehicle windows, house or building windows, mirrors, or practically any surface that requires the use of a cleaning fluid and its removable from the surface being cleaned.

In general, the cleaning apparatus 10, includes a paddle 12, a handle 14, and a drying element 16.

As shown in one embodiment in FIGS. 1–4, the paddle 12 is formed of a generally planar plate 20 having one of a number of different configurations or sizes. The plate 20 is preferably formed of a lightweight material, with a suitable plastic material being preferred. However, other materials, such as metal, wood, composites, etc., may also be employed.

The plate 20 has a generally rectangular or possibly square configuration with four exterior side edges each denoted by reference number 22. Rounded corners or radii are formed at the juncture of each of two side edges 22. The plate 20 is also formed with a first or rear surface 50 and a second, opposed, front surface 52.

The plate 20 may be provided in two different sizes, such as a small size and a large size. By example only, a small size plate 20 may have dimensions of 5"×7". The larger plate 20 may have dimensions of 7"×9". It will be understood that the plate 20 may also be formed with a square configuration of equal length side edges 22 and with other square or rectangular dimensions as needed for a particular cleaning application.

Figure 5:
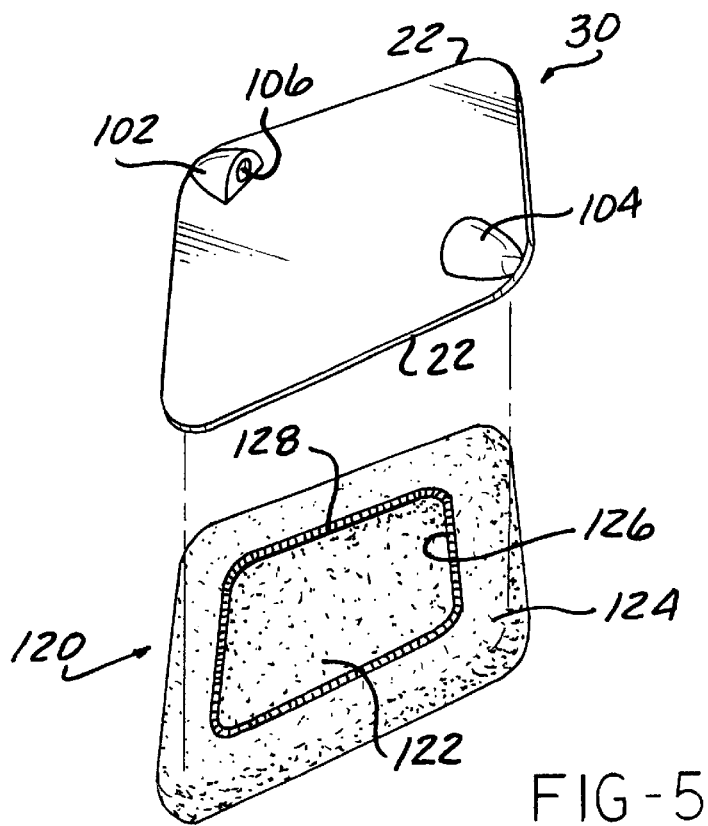
FIG. 5 is a perspective view of a second embodiment of a drying element and paddle.

The paddle 12 may also be formed in other configurations for drying different shaped windows or portions of a vehicle window. As shown in FIG. 5, a plate 30 has a general oval shape with maximum dimensions of 7"×9" for a large oval shaped plate 30 or 5"×7" for a smaller oval shaped plate 30. All of the exterior surface or side edges of the paddle 12 are smoothly curved without any sharp projections or corners.

Figure 6B:
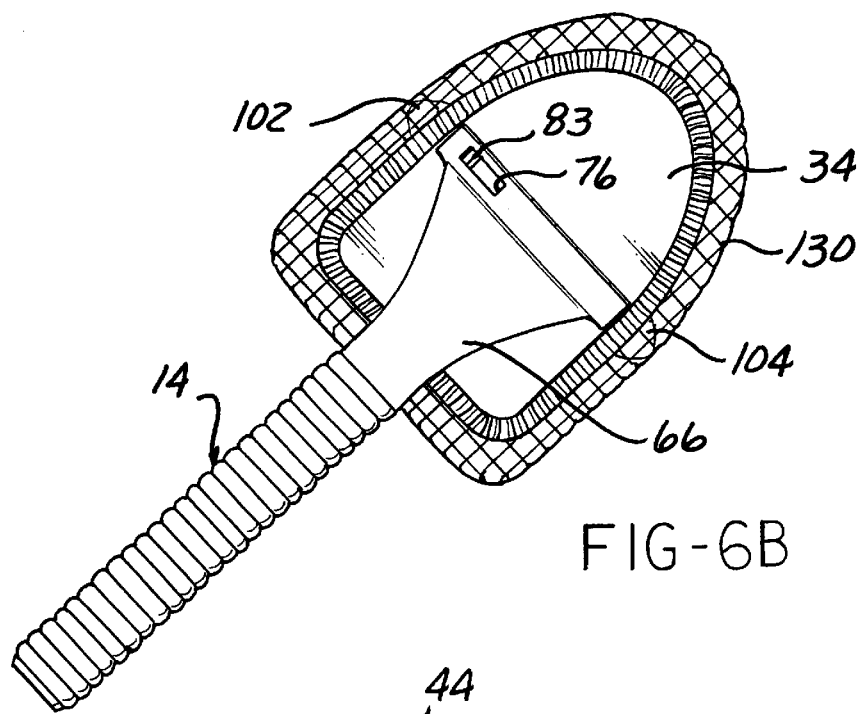
FIG. 6B is a perspective view of the assembled cleaning apparatus of FIG. 6A with the scrubbing element mounted thereon.
Figure 6A:
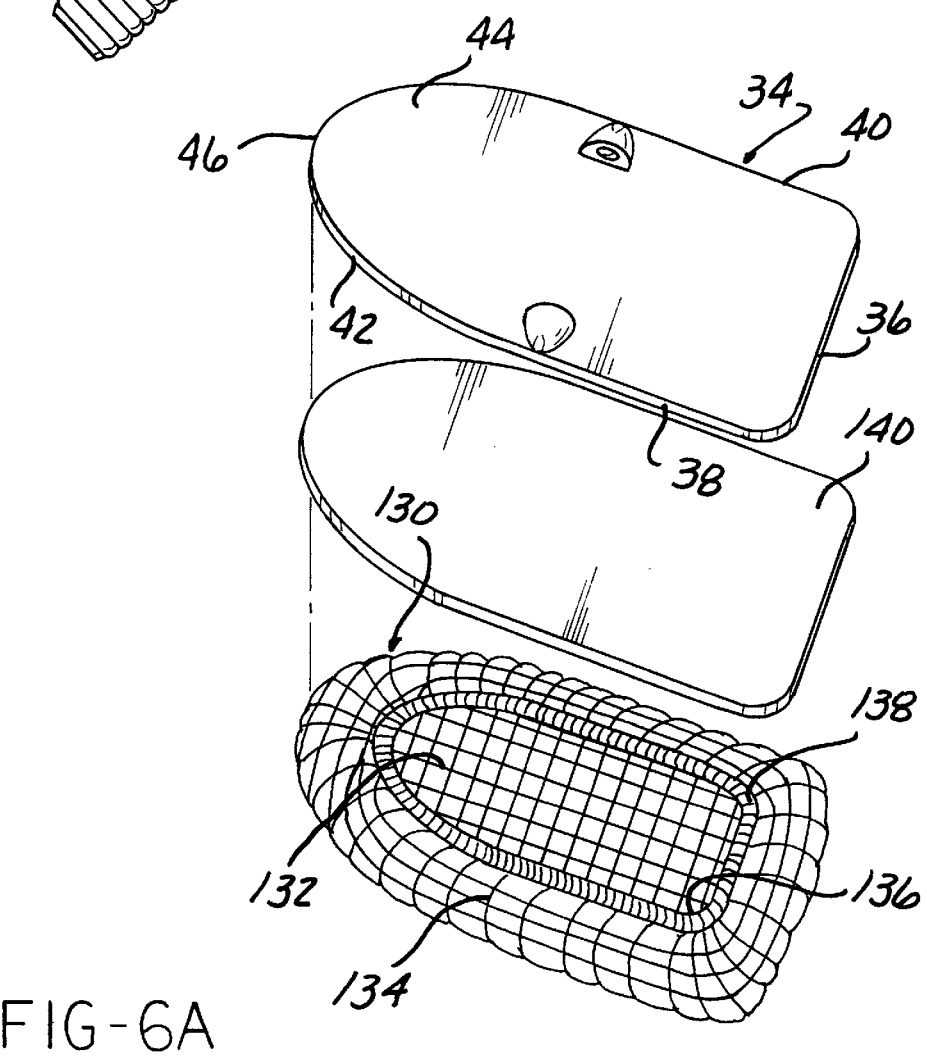
FIG. 6A is an exploded perspective view of a scrubbing element and paddle.

FIGS. 6A and 6B depict plate 34 which may also be used to form the paddle 12 of a cleaning embodiment of the apparatus 10. In this embodiment, the plate 34 has a first flat side edge 36 which smoothly merges into two generally perpendicularly extending side edges 38 and 40. The side edges 38 and 40 have an end portion 42 and 44, respectively, which tapers inwardly toward each other thereby narrowing the width of the plate 34 at a second end 46 opposite from the side edge 36. The tapered portions 42 and 44 extend to a smoothly rounded apex or second end 46.

Figure 2:
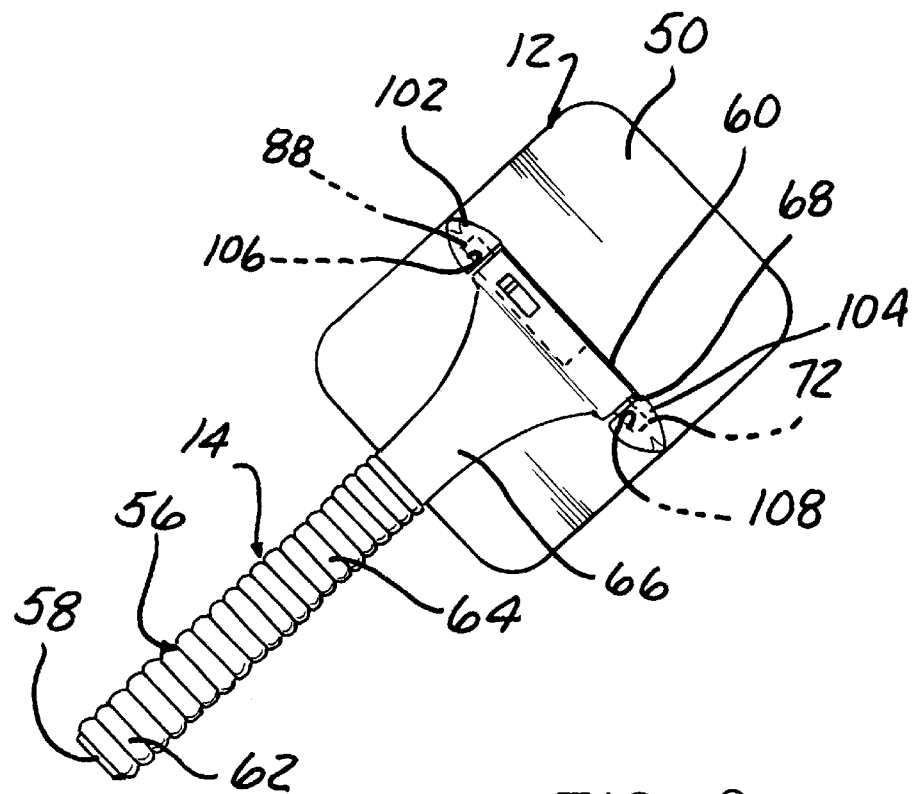
FIG. 2 is a perspective view of the handle and paddle of the cleaning apparatus shown in FIG. 1.

As shown in FIGS. 1 and 2, the paddle 12, regardless of its plate configuration 20, 30 or 34, may have a generally planar shape. A slight concave bend may also be formed in any of these plate 20, 30 or 34.

Figure 3:
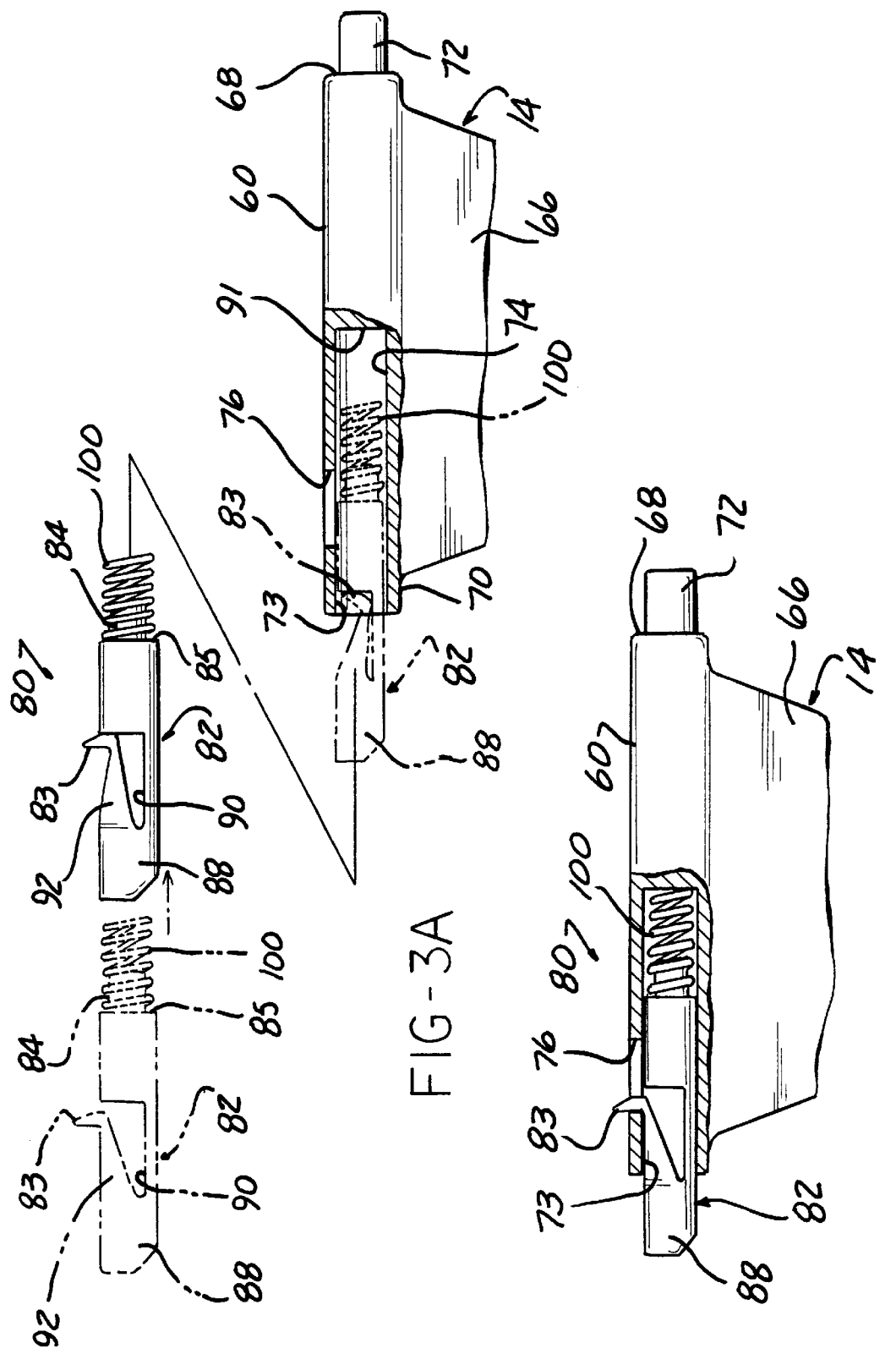
FIG. 3A is a sequential representation of the insertion of the spring biased pin into the handle shown in FIGS. 1 and 2.
FIG. 3B is a partially broken-away, plan view of the spring biased pin in its assembled position in the handle.

Referring now to FIGS. 1–3, the handle 14 of the cleaning apparatus 10 may take one of a variety of different shapes to provide a convenient gripping surface even when wet. Thus, by example, the handle 14, shown in FIGS. 1 and 2, is formed of a lightweight material, such as a somewhat rigid, although flexible and slightly bendable plastic. The handle 14 is formed of an elongated member 56 of one of at least two distinct lengths and having a first end 58 and an opposed second end 60. The elongated member 56 extends generally planarly between the first and second ends 58 and 60. Although the member 56 may have a constant cross-section and a constant width dimension from end to end, in order to provide a more easily grippable surface 14, the member 56 is formed with a first enlargement 62 at the first end 58. The opposed side edges of the member 56 taper inwardly from the first enlargement 62 to a smaller width intermediate portion 64 before tapering outwardly to a second enlarged portion 66 adjacent the second end. At least a portion of the first enlargement 62 and the intermediate portion 64 of the member 56 may be formed with a rough or contoured exterior surface, such as a series of serrated, spaced ridges or projections as shown in FIGS. 1 and 2, to provide an easily grippable surface even when wet.

As shown in FIGS. 2 and 3, the side edges of the second enlarged portion 66 taper smoothly outward from the intermediate portion 64 and terminate in opposed first and second side edges 68 and 70, adjacent the second end 60 of the member 56.

The cleaning apparatus 10 also includes means for mounting any of the plates 20, 30 and 34, one at a time, to the handle 14. Preferably, the mounting means includes means for detachably mounting the plates 20, 30 and 34 to the handle 14. More preferably, means are provided for pivotally and detachably mounting the plates 20, 30 and 34 to the handle 14.

According to a preferred embodiment of the present invention shown more clearly in FIGS. 3A and 3B, the mounting means includes a pivot pin 72 mounted or unitarily formed on the first side edge 68 of the member 56. The opposite or second side edge 70 is formed with an aperture 73 which opens to an interior chamber 74 in the second enlarged portion 66 of the member 56 adjacent the second end 60. An opening or cut out 76 in the exterior surface of the handle 14 communicates with the interior chamber 74.

A spring biased pin assembly 80 includes a slider 82 having a generally cylindrical cross section. The slider 82 is formed with a reduced diameter first end in the form of a circular sleeve 84. A shoulder 85 on the slider 82 form a seat for a biasing spring, such as a coil spring 100 which also engages one end of the interior chamber 74.

The opposed end of the slider 82 is formed as a pivot pin 88 having essentially the same shape as the pin 72 mounted on the side edge 68 of the handle 14. A notch or recess 90 is formed in the slider 82 adjacent the pin 88 at one end of the slider 82. The recess 90 forms a resilient, movable arm 92 along one side of the slider 82. The free end of the arm 92 is formed in a projection or catch 83 which extends beyond the exterior surface of the adjacent portion of the slider 82 in a normal, biased position shown in FIG. 3A.

In assembling and mounting the spring biased pin assembly 80 as shown in FIGS. 3A and 3B, the spring 100 is mounted over the sleeve 84 on the slider 82. The spring biased pin assembly 80 is inserted spring first through the aperture 73 into interior chamber 74 in the handle member 56.

The arm 92 is depressed by the user toward the opposite side of the slider 82 to enable the outer end of the projection or catch 83 to be inserted through the aperture 73 in the handle 14. The end of the catch 83 is angled to aid in downward movement of the catch 83 upon engagement with the end 70.

Continued insertion forces are exerted on the end of the pin 88 of the slider 82 until the projection 83 passes the interior edge of the opening 76 in the enlarged end portion 66 of the handle 14. The resilient nature of the arm 92 enables the projection 83 to snap outward, as shown in FIG. 3B, to lock the spring biased pin assembly 80 within the interior chamber 74 of the handle 14 as shown in FIG. 3B. The spring 100 is compressed a slight amount to exert a spring force against the slider 82 to maintain the slider 82 in a position in which the projection 88 normally engages one edge of the opening 76 in the handle 14.

As shown in FIGS. 1 and 2, the pins 72 and 88 are co-axially aligned and form part of hinge means which are rotatably mountable in opposed hinge members 102 and 104 as shown in FIG. 1. Each of the hinge members or receivers 102 and 104 are preferably unitarily formed as part of the first or rear surface 50 of the paddle 12. Since the paddle 12 is preferably formed of a plastic, the hinge members 102 and 104 may be unitarily molded as part of the paddle 12.

Figure 4:
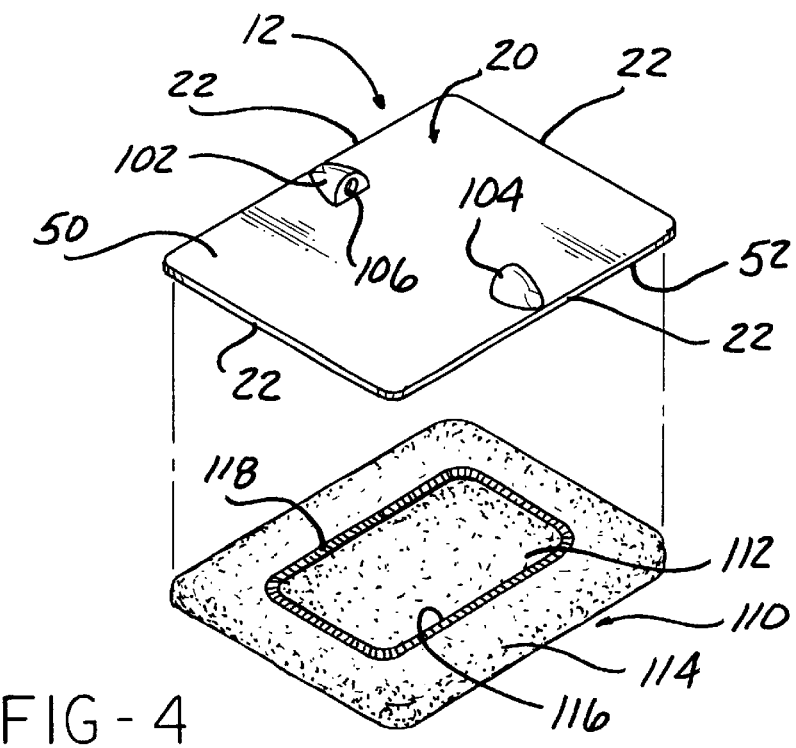
FIG. 4 is a perspective view of a first embodiment of a drying element and paddle.

Each of the hinge members 102 and 104 are in the form of solid bodies which are unitarily formed as part of the plate 20 and project upwardly from the first rear surface 50 of the plate 20. As shown in FIGS. 4 and 5, each of the hinge members 102 and 104 is formed with an inner face opposing the inner face of the opposed hinge member in a smoothly curved or arcuate shaped outer surface extending toward the adjacent side edge 22. Alternately, the hinge members 102 and 104 may be simple flanges projecting perpendicularly from the first rear surface 50 of the plate 20, with each flange having an aperture for receiving the pivot pins 72 and 88.

Thus, the internal bores 106 and 108, respectively, receive the pivot pins 88 and 72, respectively, on the handle 14 to pivotally couple the plates 20, 30 and 34 to the handle 14 and enable substantially 180° pivotal movement of the handle 14 relative to the plates 20, 30 and 34.

Each plate embodiment of the paddle 12 is coupled to the handle 14 by pushing the projection 83 on the slider 82 away from the adjacent side edge 70 of the handle member 56 to retract the end 88 of the slider 82 inwardly within the interior chamber 74 in the second enlarged portion 66 of the handle member 56 to enable the second side edge 70 to be disposed adjacent to the inner surface of the second hinge member 102, it being understood that the opposed pivot pin 72 has already been inserted into the bore 108 in the second hinge member 104. Release of the projection 83 allows the spring 100 to move the slider 82 away from the spring stop 91 and to urge the second pivot pin 88 outwardly through the aperture 73 in the second side edge 70 of the handle member 56 and into the bore 106 in the hinge member 102.

The projection or catch 83 is positioned along the length of the slider 82 from the second pivot pin end 88 to enable the pivot pin 88 to be completely retracted within the second end 60 of the handle 14 when the projection 83 engages the far end of the opening 76. Release of the moving force on the projection 83 enables the spring 100 to move the slider 82 in an opposite direction until an opposite edge of the projection 83 engages the edge of the opening 76 and the pivot pin 88 projects exteriorly of the second end 60 of the handle 14.

A first drying element embodiment of the cleaning element 16 which is removably mountable on the paddle 12 is shown in FIG. 4. In this embodiment, the drying element is in the form of a pliable body 110 sized to releasably mount about the plate 20 of the first embodiment of the paddle 12. Thus, the body 110 has a first major surface 112 which is disposable adjacent a second front surface 52 of the plate 20, a continuous side edge 114 extending from the first major surface 112, and a peripheral edge 116 surrounding an open end opposite the first surface 112. The peripheral edge 116 may be stitched to prevent unraveling or separation of the fibers forming in the body 110. Preferably, the body 110 is formed of an absorbent material, such as cotton, etc.

Elastic means 118 in the form of an elastic band is stitched or otherwise attached to the peripheral edge 116 of the body 110 to provide an elastic force for closing the peripheral edge 116 to a small open diameter to thereby securely, yet releasably mount the body 110 about the paddle 12. At the same time, the elastic means 118 allows the body 110 to be easily removed from the paddle 12 and replaced with a clean, dry body 110 when necessary.

It will be understood that the body 110 may be provided in different sizes to conform to the shape and size of the large or small plates 20 described above.

A second embodiment of a body 120 usable as the drying element is shown in FIG. 5 and includes a first major surface 122, a continuous side edge 124 and a peripheral edge 126. Elastic means 128 are secured to the peripheral edge 126. Preferably, the peripheral edge 126 and the adjacent side edge 124 are formed or cut to a generally oval shape to enable the body 120 to conform to the shape of the oval plate 30.

Yet another body 130, shown in FIGS. 6A and 6B, may be used as the cleaning element 16 for the plate 34. Like the other bodies 110 and 120, the body 130 is formed of a first, generally planar surface 132, a side edge 134 which terminates in continuous peripheral edge 136 surrounding an opening, and elastic means 138 secured to the peripheral edge 136. The peripheral edge 136 and the side edge 134 are preferably formed in the shape of the plate 34 to enable the body 130 to be removably mounted about and to conform to the shape of the plate 34. As shown in FIG. 6A, an absorbent layer or pad 140 of substantially the same shape as the plate 34 is interposed between a major surface of the plate 34 and the first major surface 132 of the body 130 to provide fluid absorbent features. The pad 140 can be loosely interposed between the plate 34 and the body 130 or fixed on the plate 34 by adhesive or other suitable means. The body 130, in this embodiment, is preferably formed of a mesh or rough material to act as a scrubbing surface in conjunction with a fluid filled absorbent layer 140 which dispenses fluid during the scrubbing operation. Thus, the body 130 and absorbent layer 140 function as a scrubbing element to apply cleaning fluid to a window and, with suitable scrubbing movement, to simultaneously loosen dirt and other debris from the window.

The various drying and cleaning bodies 110, 120 and 130 shown in FIGS. 4–6 may be used to perform a variety of cleaning or drying tasks. Any of the bodies 110 and 120 may be used merely as a dusting cloth to remove dust from a vehicle window or other interior vehicle surface. Further, the body 130 shown in FIG. 6 and its associated plate 34 with the rounded end 46 and interior absorbent layer 140 is ideally suited to act as a sponge and scrubbing surface in applying cleaning fluid or water to the interior surface of a vehicle window and scrubbing or removing debris stuck on a window.

Once the absorbent layer 140 is wetted with the cleaning fluid, the handle 14 of the cleaning apparatus 10 is grasped by one hand of the user and then moved adjacent to the window until the body 130, contacts the interior surface of the window. The cleaning element 10 is then moved in any motion, such as back and forth, sideways, circular or combinations thereof to apply the cleaning fluid to the entire interior surface of the window and to remove any debris stuck on the window. The body 130 and plate 34 are then removed from the handle 14 by simply reversing the insertion operation of the spring biased pin assembly 80 as described above to detach the plate 34 and the from the handle 14. Specifically, the user exerts a sliding force on the projection 83 to the right, in the orientation shown in FIG. 3B, urging the slider 82 against the force of the spring 100 until the pin 88 on the slider 82 disengages from the associated hinge 102. This enables the paddle 12 and the handle 14 to be separated from each other. One of the other bodies 110 or 120 and its associated plate 20 or 30, respectively, is then attached to the handle 14 as described above. The body 110 or 120 is then brought into engagement with the window and again moved in any fashion across the entire surface of the window to dry the previously applied cleaning fluid and remove any loose debris from the window.

If, at any time, the body 110 or 120 becomes saturated with cleaning fluid or accumulates a significant amount of dirt or other debris, the user may simply remove the body 110 or 120 from the associated paddle 12 and then mount a clean, dry body 110 or 120 on the paddle 12 to continue with the cleaning operation.

In a further use of the cleaning apparatus described above, any of the paddles, such as paddle 34 shown in FIG. 6A, can be employed without the handle 14 by a user merely grasp the enlarged receivers 102 and 104 with his or her hand to manipulate the paddle and the cleaning element attached thereto over a surface to be cleaned.

Figure 7:
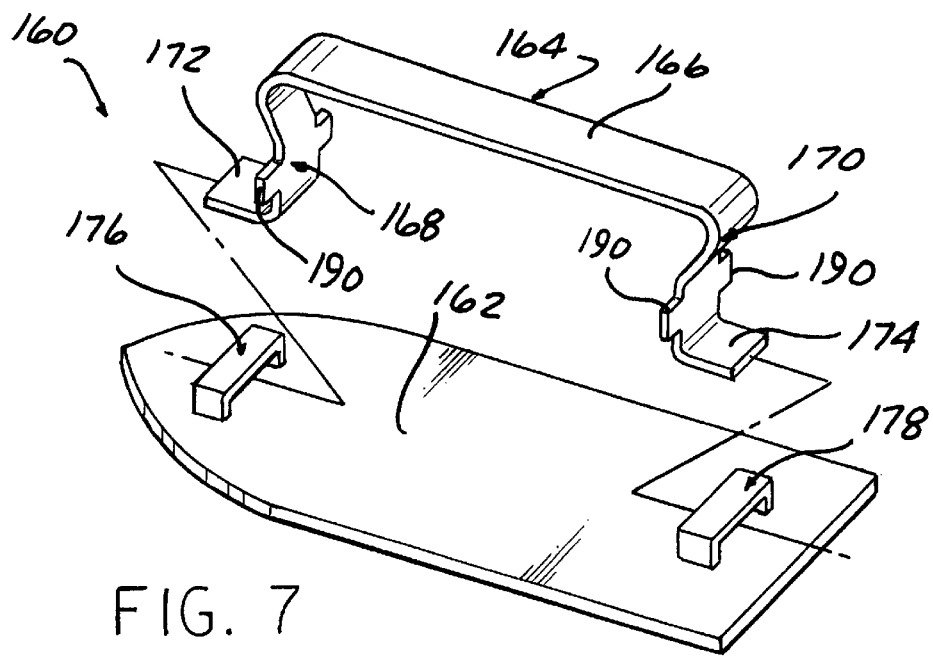
FIG. 7 is an exploded perspective view of another aspect of the present cleaning apparatus.
Figure 8:
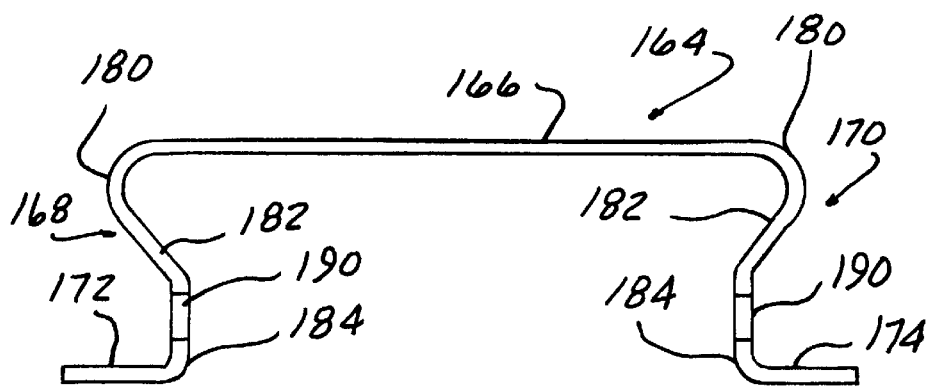
FIG. 8 is an enlarged side elevational view of the handle of the cleaning apparatus shown in FIG. 7.
Figure 9:
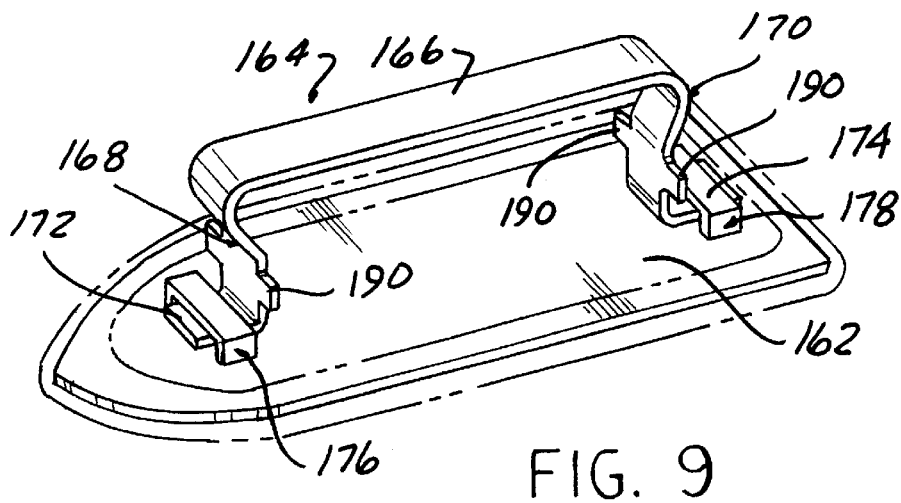
FIG. 9 is a perspective view of the assembled cleaning apparatus shown in FIGS. 7 and 8.

Referring now to FIGS. 7–9, there is depicted another aspect of the present cleaning apparatus which may form part of an overall cleaning system constructed in accordance with the present invention. As shown in FIGS. 7, 8, and 9, the cleaning apparatus 160 includes a paddle 162 which is depicted as having the same overall shape as the paddle 40 shown in FIG. 6A. It will be understood that the paddle 162 is shown by example only as any of the preceding paddles may be employed in the cleaning apparatus 160. In addition, the cleaning elements 16, described above, may also be employed over the paddle 162.

In this aspect, the cleaning apparatus 160 includes a handle 164 having a generally inverted U-shape. The handle 164 is preferably formed of a flexible plastic.

The handle 164 has a strip-like form including an upper portion in the form of a generally planar top wall 166 which is adapted to be grasped by the hand of the user to manipulate the cleaning apparatus 160 over a surface to be cleaned, a pair of depending side legs 168 and 170 and a pair of outwardly extending lower ends 172 and 174 which project outwardly from the side legs 168 and 170, respectively. The ends 172 and 174 are flat or planar in shape and are adapted to releasably engage a pair of receivers 176 and 178 formed on one surface of the paddle 162. The receivers 176 and 178 are aligned with each other, preferably along the longitudinal centerline of the paddle 162. By way of example only, each receiver 176 and 178 is formed of an inverted U-shaped tab having a central portion spaced from the adjoining surface of the paddle 162 to form an aperture therebetween sized to releasably receive one of the lower ends 172 and 174 of the handle 164.

The side legs 168 and 170 of the handle 164 have a smoothly curved, arcuate, S-shape to provide a degree of springiness to the handle 164. In the exemplified shape, each of the side legs 168 and 170 initially curves outward from one end of the top wall 166 of the handle 164 in a first curved portion 180 before curving inward toward the opposed side leg along portion 182. The side legs 168 and 170 then reverse direction and smoothly curve along portion 184 to a junction with the lower ends 172 and 174, respectively.

For added strength, the portions 180 and 184 have a greater thickness than the adjoining top wall 166, surface portion 182 or the lower ends 172 and 174 as the portions 180 and 184 will encounter the greatest amount of flexure during movement of the cleaning apparatus 160.

Optional, elongated, laterally extending tabs 190 project outward from opposed side edges of the surface 184 on each side leg 168 and 170. The tabs 190 provide a convenient surface for inserting and removing the lower ends 172 and 174 from the receivers 176 and 178, respectively.

Thus, there has been disclosed a unique cleaning apparatus and cleaning system for cleaning and drying the interior surfaces of windows and, particularly, vehicle windows which is easy to use, is capable of scrubbing and drying all of the window surfaces, including the lower edges adjacent the vehicle dash board and rear shelf, has easily detachably mounted paddles and scrubbing and drying elements enabling different shaped paddles and fresh, dry cleaning elements to be easily attached to the handle for scrubbing and drying various portions of or different shaped windows as well as enabling the cleaning elements to be easily removed when wet or soiled and a new element applied to the paddle.

Figure 10:
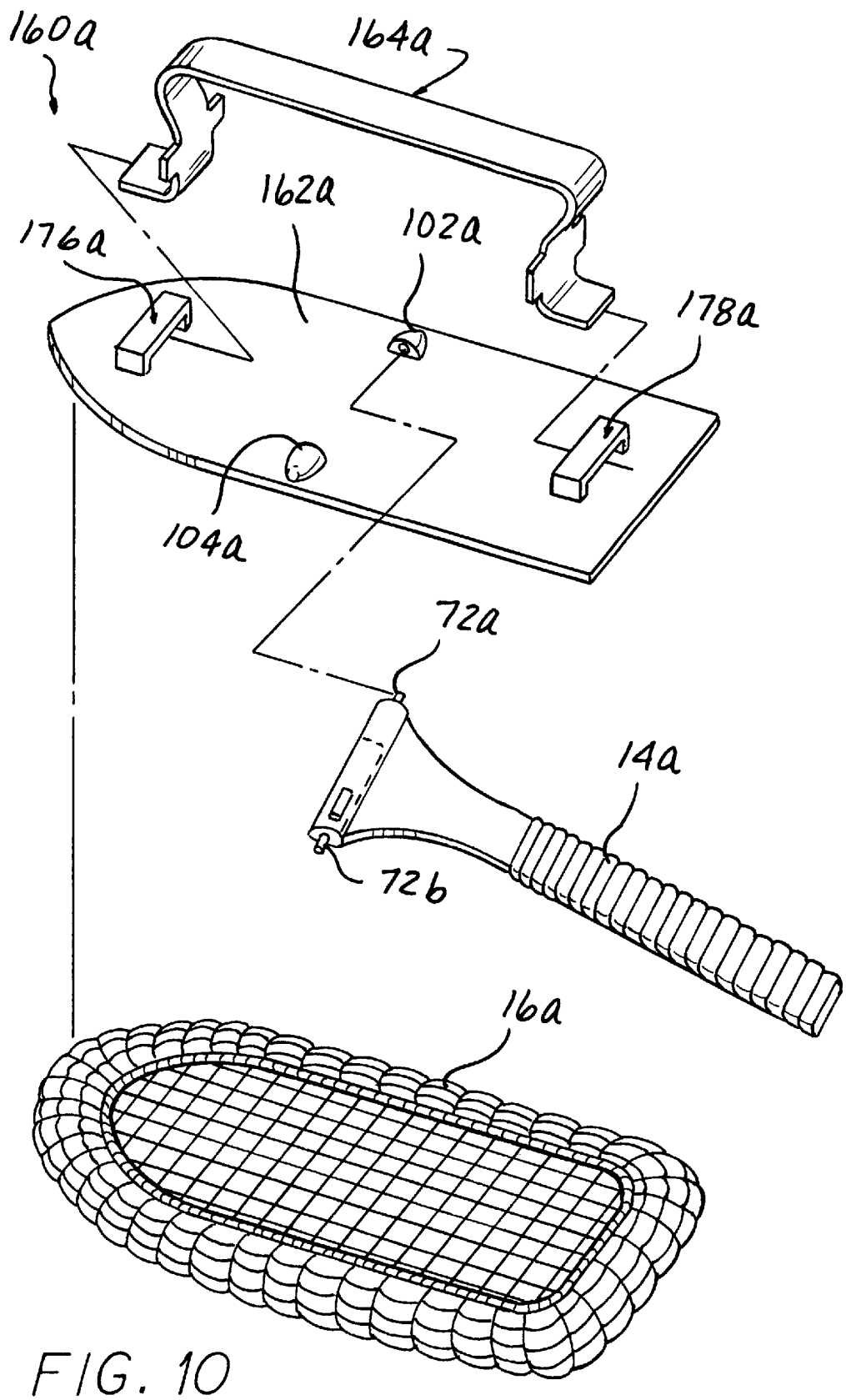
FIG. 10 is a perspective view of a cleaning apparatus having two interchangeable handles.

The present invention provides a cleaning apparatus 160a as shown in FIG. 10. The cleaning apparatus 160a includes a paddle 162a, a first handle 14a having first and second opposed ends, and a second handle 164a having opposed ends. The first and second pivot pins 72a and 72b extend coaxially from the opposite side of the second end of the handle 14a. The paddle 162a includes first and second receivers 102a and 104a. Each of the receivers 102a and 104a are capable of receiving one of the first and second pivot pins 72a and 72b for pivotally connecting the first handle 14a to the paddle 162a. The paddle 162a also includes third and fourth receivers 176a and 178a for receiving one of the ends of the second handle 164a. One of the first and second handles 14a and 164a may be removably mounted on the paddle 162a at one time. The cleaning apparatus 160a also includes a cleaning element 16a removably mountable over the paddle 162a.

What is claimed is:

1. A cleaning apparatus comprising:
    a paddle;
    a pair of receivers carried on the paddle;
    a cleaning element removably affixed to the paddle; and
    a handle connected to the paddle, the handle having first and second lower ends respectively mountable in the receivers carried on the paddle wherein each receiver includes a tab having a portion spaced from the paddle and defining an aperture therebetween for receiving one of the lower ends of the handle, the handle having a user engageable upper portion, and side legs extending from the upper portion to the lower ends releasably mountable in the receivers.

2. The cleaning apparatus of claim 1 wherein the side legs have an arcuate shape.

3. The cleaning apparatus of claim 1 wherein the side legs have an S-shape.

4. The cleaning apparatus of claim 1 wherein the upper portion, the side legs and the lower ends are unitarily formed as a one-piece member.

5. The cleaning apparatus of claim 1 wherein:
    the pair of receivers are mounted along a longitudinal centerline extending through a major axis of the paddle.

6. The cleaning apparatus of claim 1 wherein: the cleaning element is formed of a fluid absorbent material.

7. The cleaning apparatus of claim 1 wherein: the cleaning element is formed of a rough textured material to form a scrubbing element.

8. The cleaning apparatus of claim 7 wherein the rough textured material is an open mesh material.

9. The cleaning apparatus of claim 1 further comprising:
    a fluid absorbent material layer interposed between the paddle and the cleaning element for dispensing fluid through the cleaning element.

10. The cleaning apparatus of claim 1 wherein the handle is plastic.

11. The cleaning apparatus of claim 1 wherein each side leg further comprises:
    a middle portion having a greater thickness than portions of said side leg adjacent the upper portion and the lower end.

12. The cleaning apparatus of claim 1 further comprising:
    at least one tab extending from at least one of the side legs for moving the lower end adjacent the at least one side leg relative to the receiver on the paddle.

13. The cleaning apparatus of claim 12 wherein the at least one tab further comprises:
    first and second tabs extending from the at least one side leg in substantially opposite directions.

14. A cleaning apparatus comprising:
    a paddle;
    a pair of receivers carried on the paddle;
    a cleaning element removably affixed to the paddle; and
    a handle connected to the paddle, the handle having first and second lower ends respectively mountable in the receivers carried on the paddle, the handle having a user engageable upper portion, and side legs extending from the upper portion to the lower ends releasably mountable in the receivers, portions of each side leg having a greater thickness than adjacent portions of each side leg, the upper portion and the lower ends.

15. It The cleaning apparatus of claim 14 wherein the portions of greater thickness are located at the highest flexure points of the handle.

16. A cleaning apparatus comprising:
    a paddle;
    a pair of receivers carried on the paddle;
    a cleaning element removably affixed to the paddle; and
    a handle connected to the paddle, the handle having first and second lower ends respectively mountable in the receivers carried on the paddle, the handle having a user engageable upper portion, and side legs extending from the upper portion to the lower ends releasably mountable in the receivers, at least one projection extending outward from each side leg, the projection facilitating engagement of the handle with respect to the receivers on the paddle.

17. A cleaning apparatus comprising:
    a paddle;
    a first handle having first and second opposed ends;
    first and second pivot pins extending coaxially from opposite sides of the second end of the handle;

first and second receivers mounted on the paddle, each of the first and second receivers being capable of receiving one of the first and second pivot pins for pivotally connecting the first handle to the paddle;

a cleaning element removably mountable over the paddle;

a second handle having opposed ends; and third and fourth receivers mounted on the paddle, each of the third and fourth receivers adapted for receiving one of the ends of the second handle whereby one of the first and second handles may be removably mounted on the paddle at one time.

18. A vehicle window cleaning system adapted for cleaning and drying surfaces of vehicle windows, the system comprising:

a plurality of interchangeably usable paddles, at least certain of the paddles having a different peripheral shape, each paddle having opposed surfaces;

first and second handles;

first and second pairs of receivers mounted on one surface of each paddle, each first and second pair of receivers adapted for receiving the first handle and the second handle, respectively; and a plurality of cleaning elements, each removably attachable one at a time to one of the paddles, at least one of the cleaning elements having elastic means forming side edges of the cleaning element into a closed opening nominally smaller than the outer peripheral surface dimensions of each of the paddles; whereby:

one of the first and second handles, one of the plurality of paddles and one of the cleaning elements are releasably engagable to form a cleaning apparatus for cleaning a vehicle window.

19. A vehicle window cleaning apparatus adapted for cleaning and drying the interior and exterior surfaces of vehicle windows, the apparatus comprising:

a plurality of interchangeably usable paddles, each having a different peripheral shape, each paddle having first and second opposed surfaces;

one handle pivotally connectable to the first surface of one of the paddles;

first and second pivot pins extending co-axially from opposite sides of the handle first and second receivers mounted in an identical spacing -on the first surface of each of the plurality of paddles, each of the first and second receivers being capable of receiving one of the first and second pivot pins;

biasing means carried in the handle and retractably biasing one of the first and second pivot pins outward from the handle and into one of the first and second receivers for releasably pivotally connecting the handle to one of the paddles;

a plurality of cleaning elements, each removably attachable one at a time to the second surface of one of the paddles; and at least one of the cleaning elements having elastic means forming side edges of the cleaning element into a closed opening normally smaller than the outer dimensions of each of the paddles.

20. The apparatus of claim 19 wherein:

at least one of the plurality of cleaning elements is formed of a rough textured material to form a scrubbing element.

21. The apparatus of claim 20, wherein the rough textured material is an open mesh material.

22. The apparatus of claim 20 further comprising:

a fluid absorbent material layer interposed between the paddle and the cleaning element and containing a fluid for dispensing the fluid through the cleaning element.

* * * * *